United States Patent [19]

Quevrin

[11] 3,707,767

[45] Jan. 2, 1973

[54] MATRIX WITH INTEGRATED SEMICONDUCTORS FOR DEAD MEMORY

[75] Inventor: Janic Quevrin, Ollainville, France

[73] Assignee: Compagnie Generale D'Electricite, Paris, France

[22] Filed: June 26, 1970

[21] Appl. No.: 50,285

[30] Foreign Application Priority Data

June 26, 1969 France ................................ 6921528

[52] U.S. Cl. ........................................ 29/593, 29/574

[51] Int. Cl. ................................................ H01l 1/16

[58] Field of Search ................. 29/574, 575, 569, 593

[56] References Cited

UNITED STATES PATENTS 2,982,002 5/1961 Shockley ................................ 29/574

2,994,121 8/1961 Shockley ................................ 29/574

*Primary Examiner*—Robert L. Spicer, Jr.

*Attorney*—Craig and Antonelli

[57] ABSTRACT

Process of manufacturing a matrix with integrated semiconductors for a dead memory, comprising semiconductor components included in the intersections of lines-columns of a network, which are adapted to being subjected to an electric test between line and column.

The process consists in making on the one hand each of the columns, or lines, and on the other hand at least one of the regions of the components in the form of a pair of demi-columns, or half-columns, and demi-components, or half-components.

4 Claims, 3 Drawing Figures

MATRIX WITH INTEGRATED SEMICONDUCTORS FOR DEAD MEMORY

The present invention relates to the manufacture of a matrix with integrated semiconductors capable of receiving a dead memory inscription or registration.

The term "dead memory" is used to define a memory which is established once and for all, in which the data are stored in a permanent fashion, and which is subjected to an interrotation only as an exception.

This designation distinguishes this type of memories from the so-called conventional memories which have the function of storing, for a very brief period of time, data that are subject to being effaced. In contrast to conventional memories, the dead memories are memories intended for reading only, also characterized by the letters ROM for "Read Only Memory".

In the manufacture of matrices with semiconductors of the integrated type, networks being generally rectangular in shape, lines and columns of reduced dimensions are formed, and between these a large number of components is grouped serving for the inscription or recording of points or bits. It is not rare in connection with a network of 16 over 20 millimeters to group or thus provide from 30,000 to 60,000 bits. These networks are effectively made by means of "levels" or layers which are successively piled on to the substrate in the course of the manufacture. If thus the horizontal lines of the network appertain, for example, to a first level or stratum, the vertical columns of the same network may appertain, for example, to a second level or stratum which may be superimposed on an insulating layer that is placed upon the first level. As a general rule, the components used for the inscription of raid dead memories with integrated semiconductors are diodes or bipolar transistors. In the case of diodes or bipolar transistors, each component comprises at least two electrical connections; if the first of these connections solidarizes electrically the component and one line of the first level, the second connection will solidarize or unite it with a column of the second level. The inscription, however, can be validly or cogently provided only on components having good characteristics. Any defective component must be traced and eliminated from the network prior to the inscription. This condition of individual quality of each component designated for receiving an inscription with a view toward creating a bit thus implies a quality test. The test which allows for bringing out and detecting defective components is an electrical test and naturally carried out between the normal access routes of the components; in other words, between a line appertaining to the first level and a column appertaining to the second level. This electrical test, however, poses for the person carrying it out complex problems when the yield or output in components having good quality is different from and short of the ideal yield of 100 percent. It is easy to see, in fact, that for a column comprising a connection with 50 components, if only a single one among these 50 components happens to be defective, the electrical test will discover it unequivocally; as a matter of fact, the crossing point between line-column essentially indicates it, provided that no other defective component is present on the line being considered. This is no longer the case when the quality yield of the components is lowered, instead the high number of defective components involves parasitic loopings or curlings of the electric circuit used for the test. FIG. 1 throws light on the process of establishing such parasitic loopings on a network fragment in which the lines have been shown in dotted fashion, such as 1'1, 2'2, 3'3; the access terminals of these lines have been shown at 1, 2, 3, and the columns in plain strokes, such as $C_1$, $C_2$, $C_3$. It is assumed that there be three defective components at 11, at the crossing or intersection of column $C_1$ with line 1, at 21 at the crossing of column $C_2$ line 1, 1, at 22 at the crossing of column $C_2$ with line 2. If, in an effort to find and determine the quality of the component 12, an examination is made between column $C_1$ and line 2, a short-circuit effect will indeed be discovered due to the parasitic path: line 2-component 22-component 21-component 11-column $C_1$. It may be concluded from this examination that the component 12 situated at the crossing of line 2-column $C_1$ is defective, whereas this is not true at all since the component 12 is in good order and the looping has been made by means of other components that are bad and not individually identified. The electrical test loses its meaning according to the statistical calculations made in assuming an uncertain distribution when the yield is lowered to 92 percent. As a matter of fact, however, 92 percent is still a relatively high yield as far as integrated semiconductor components are concerned. It becomes indispensable to remedy this situation by providing either for a test method or a particular network provision such that the drawback outlined above no longer arises. Furthermore, it is necessary to furnish to the client who has to inscribe on the memory a matrix with a "repaired" network.

A "repaired network" is one which only comprises components capable of being used for the inscription; in other words, a network from which all the defective components have been eliminated by circuit hiatuses if they still physically exist on the substrate. In the currently customary manufacturing processes, repairing consists in blowing out or forcing out the line or column containing a defective component. When the uncertain or risky distribution of defects involves too significant a drop of lines and column, the network cannot be repaired in a valid fashion and is discarded. For example, for a circuit comprising 525 components whose yield is 96 percent, 21 defective components have to be expected whose chancy distribution may involve the elimination of 21 lines or columns as being unusable for the inscription. This waste makes the scrapping of numerous networks necessary and considerably increases the cost price of each correct network which has been selected under particularly severe conditions since the yield of 96 percent on the components, taken as an example, is already a very high yield in view of the quality of a current manufacture of integrated semiconductor components.

The present invention aims at obviating this difficulty and is concerned with a process or method for making a matrix with semiconductor components which are equipped with a plurality of regions or zones comprising lines and columns assembled in a network in which each semiconductor component that occupies the place of a node is connected by means of at least one of the regions thereof, for example the base region, to a line and by means of another region, which is called emitter region, to a column, characterized in that each of the afore-mentioned columns is made in the form of a pair of adjacent demi-columns being electrically insulated with respect to each other, in that in each afore-mentioned component a pair of emitting regions is established, so-called demi-emitter regions, each of these being provided with means for being connected to the adjacent demi-column and adapted to cooperate with a common base region that itself is equipped with a connection with the line, an electric conduction test known per se being applied between column and line for placing in evidence the possibility of exploitation or operation of each afore-mentioned component forming a node and revealing any defects, any component which is found to be unusable by this test is put out of the circuit, after the choice of a direction of progression has been made from a reference mark which may consist of a column, one connects on the same line the first operable component to the first entire column situated, for example, to the right of this component, by connecting the demi-emitter at right to the demi-column adjacent thereto, and the latter constitutes moreover the left demi-column of the first column, and so forth for the following components, until a defective component is found to be out of the circuit. Thereafter connected is the component of the order being directly higher, by uniting the left demi-emitter of this component with the right demi-column of the entire column, and the demi-columns are lastly reunited with each other in the same pair by a short-circuit means.

The present invention will now be further described hereinafter on the basis of and taken in connection with the accompanying drawings which show, for purposes of illustration and by way of example only and not in a limitative manner, one embodiment of the method proposed by the present invention.

FIG. 2

Figure 1:
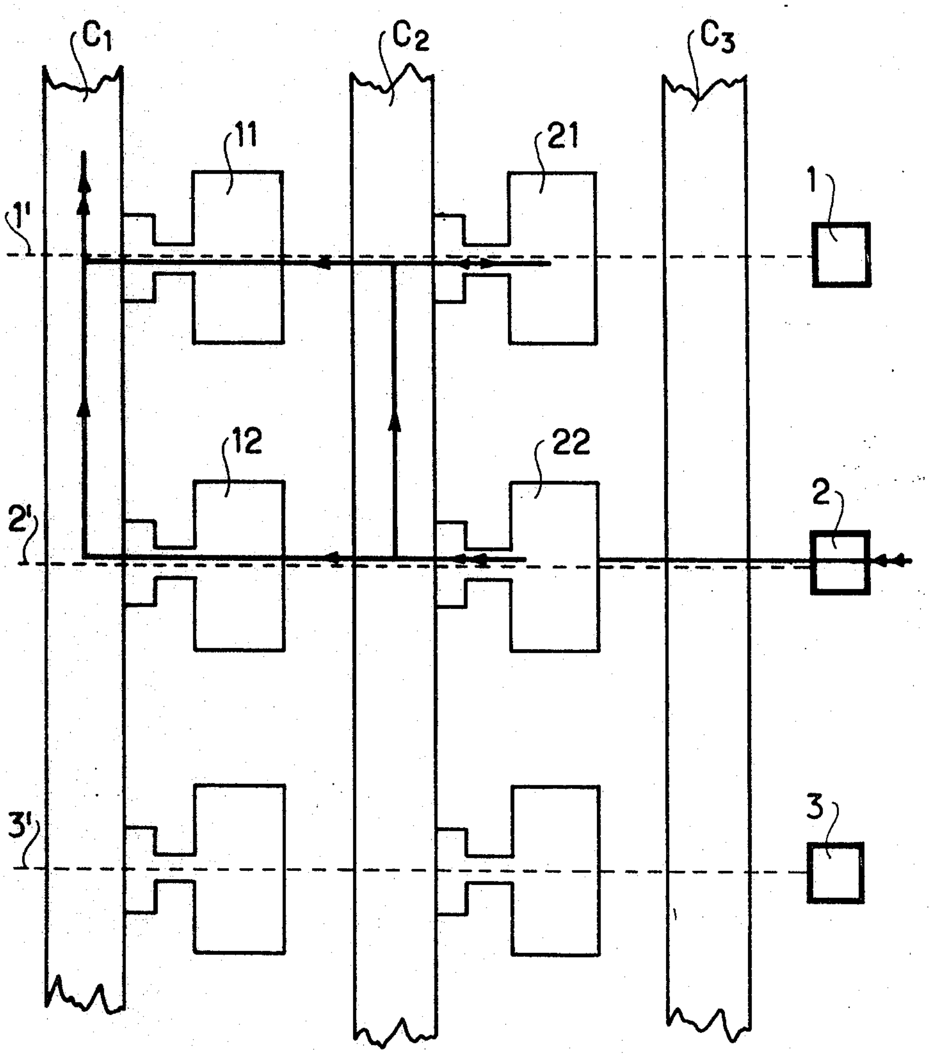
Figure 2:
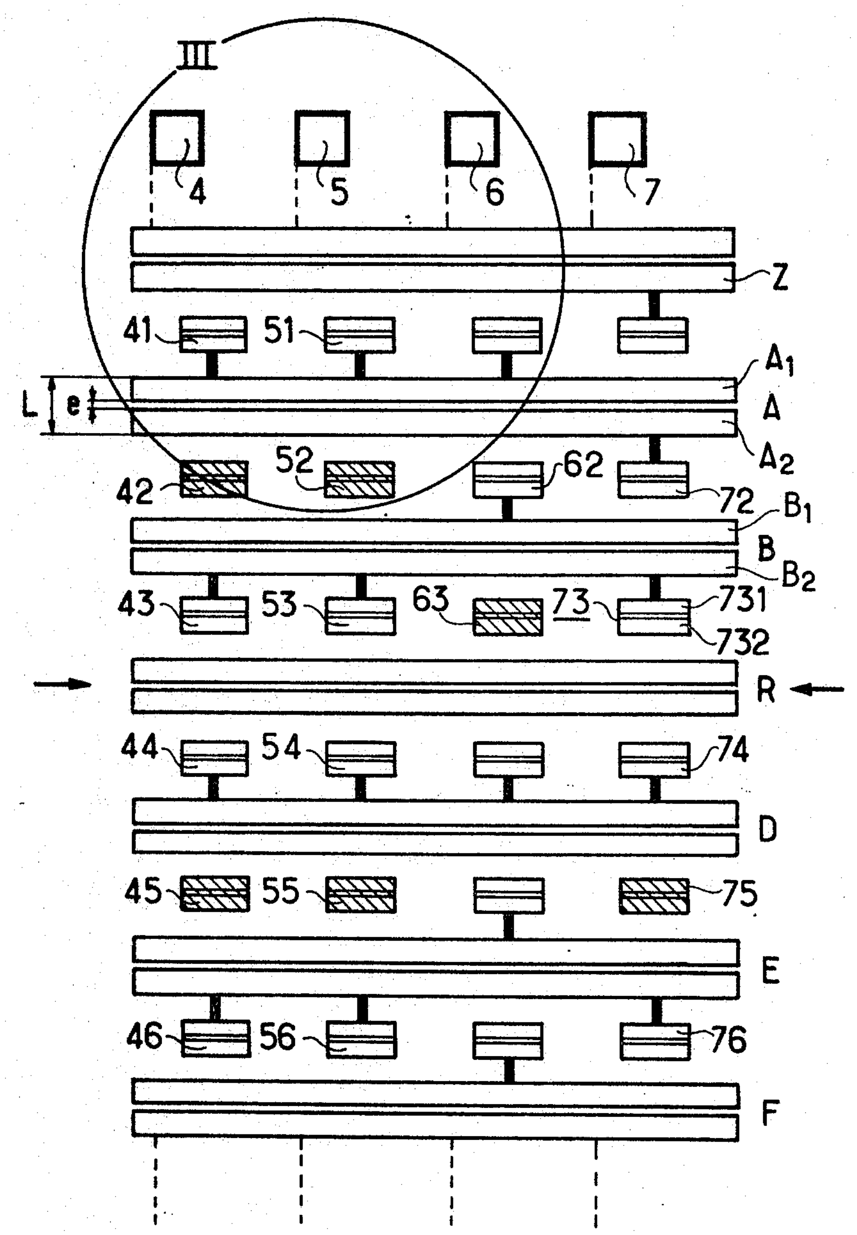
FIG. 2 represents therein a view from above of a matrix network fragment with integrated semiconductors made as proposed by the present invention, containing the columns and the components at the height of the level or stratum.

Illustrated in this figure, which is a top plan view, are the conducting columns of the matrix in plain strokes in the plane of the figure. They form a sequence designated with letters A, B, R, D, E, F. The lines of the network appertaining to the lower plane and represented by dashed lines are visible only at the two ends thereof, whereas their access terminals 4, 5, 6 and 7 are indicated in the figure. For reasons of convenience in the presentation of the drawing, the generally vertical columns have therein been shown as being horizontal. Each component is identified by a number whose first digit indicates the line to which the component belongs. Thus, the component 73 belongs to line 7 and is connected thereto by means of its base while being connected to the column B by means of its emitter. In accordance with the present invention, each column is made in the form of two demi-columns, or half columns. Thus, column A is made in the form of two half columns, $A_1$ being the upper half column and $A_2$ being the lower half column. They are insulated with respect to each other by an interval or interstice having the width *e*. Each component has two emitting regions or zones: Thus, the component 73 has two emitting regions, an upper and a lower one, 731 and 732 respectively. Each half component may be connected to the column or to the half column being adjacent thereto. A locating or marking of the bad components is made first. Having found, by virtue of this marking or spotting procedure, the components such as 42, 52, 63, 45, 55, 75 which are unusable and appear shaded in FIG. 2, it will be shown how these unusable components can, on the one hand, be replaced according to the present invention without involving the rejection of the matrix and, on the other hand, be subjected to the electrical test and to the inscription. First of all, all of the components found to be bad on the basis of the electric test are insulated electrically. Thereupon, the selection of a reference column R is made according to the invention. No component is connected on this column. All of the usable components positioned between columns R and B, such as 43, 53, 73, are connected to the lower half column designed to be part of column B. The component 63 which is defective and comprised within this interval has been disposed of by isolation and is replaced by the component 62 being positioned on the same line 6 in the order or row immediately thereabove with respect to the consecutive intervals between entire columns. In order to accomplish this, the component 62 is connected to the upper half column intended to be part of column B. For the components situated between columns A and B, two between them, the components 42 and 52 are defective and have therefore been eliminated by isolation. The component 62 has already been connected to the column B so that only the component 72 remains which is connected to the lower half column designed to being part of column A. To the upper half column designed to being part of the same column A, there will be connected the usable components 41, 51, 61 by replacing the components 42, 52, 62 which are bad or already used. The replacing operation continues by degrees in this same fashion until the exhaustion of the components of the same line on both sides of the reference column R is attained. In fact, from the reference column R and symmetrically with respect thereto, the same operation of replacing eliminated components is made gradually in the same direction of progression as the reference column. FIG. 2 thus shows the defective components 45, 55, 75 being replaced on the corresponding line by the components 46, 56, 76. The replacing operation thus takes place by degrees or gradually. By virtue of this disposition, the electric test can be carried out without ambiguity. Lastly, in the course of an operation subsequent to the reunion of the half-columns with each other, the entire or whole columns A, B, D, E, F are reconstituted, and this operation is accomplished in actual practice by metallization covering the half columns and the insulating interval or interstice *e*. In the unit such as described above and relating to a memory of 525 points, the number of lines and columns that have been eliminated will be 3 or 4, due to the use of the present invention.

FIG. 3

Figure 3:
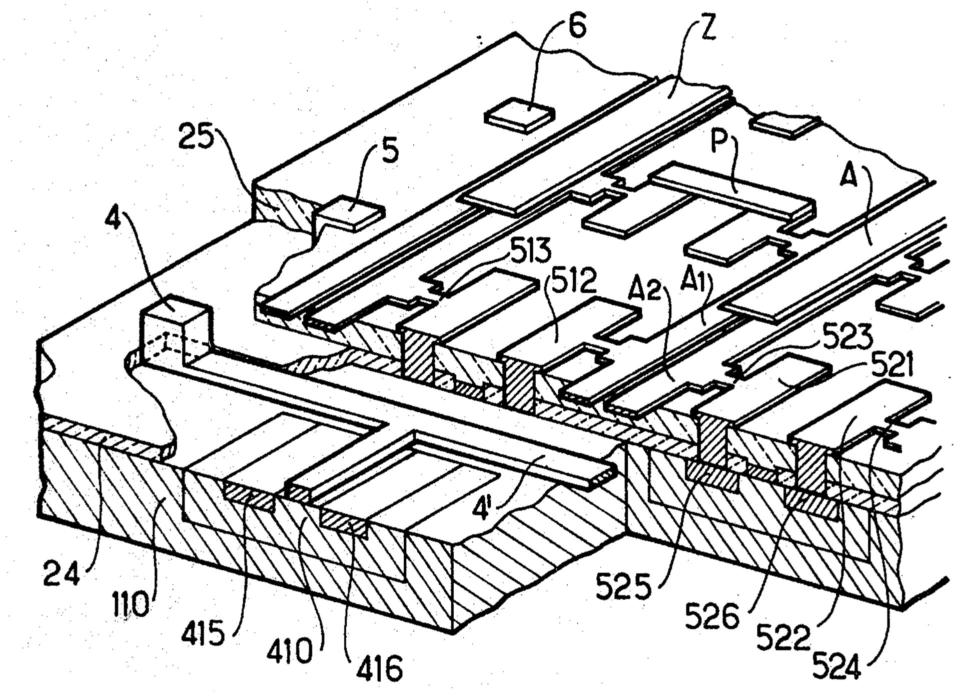
FIG. 3 is a cross-sectional perspective view of one detail of the fragment of the matrix illustrated in FIG. 2.

FIG. 3 is a perspective cross-sectional view of a concrete embodiment of the process according to the present invention. The substrate 110 is from monocrystalline silicon type N. After masking in accordance with a photolithograph process, an impurity is diffused from apertures made in an insulating layer at specific places in a manner such as to obtain in the substrate 110 regions or zones of a type having a conductibility P, such as zone or region 410. These regions or zones may constitute the bases of the components. By means of a planar technique, impurities are diffused so as to produce two regions or zones having equivalent dimensions and a conductibility of the type N in each of the previously obtained base regions or zones, such as 415 and 416 in the base region or zone 410. These regions or zones may constitute the emitters of the components. There is provided an insulating layer on the substrate and the surface of the aforementioned regions or zones; this layer is, for example, an oxide layer 24 obtained by thermal oxidation. By means of photolithography the layer 24 is opened up in order that the base regions or zones be partly uncovered, that contacts be established there, and so that these contacts be united by placing in lines. This operation is accomplished for example by metallization in vacuo. Formed thereby are lines such as 4'4 which terminate projecting terminals, such as terminals 4, 5 and 6. Above the plane formed by the oxide layer 24 and the lines, a new insulating layer 25 is provided for. This insulating layer is, for example, a layer of silicon oxide obtained by pulverization. By means of photolithography, the emitter regions or zones having previously established are uncovered, by opening the superimposed layers 24 and 25, and carried out thereon is a new metallization producing, on the one hand, the emitter contacts such as 521 and 522 on the emitter regions or zones 525 and 526 for the component 52 of FIG. 2 and, on the other hand, the half-columns and the contacts between each emitter and each neighboring half-column. Each of the afore-mentioned contacts has the form of a constriction such as the contact 523 in FIG. 3. This constriction has a practical role since it serves as safety fuse. For a current value exceeding a given value, the fusion of the constriction assures the automatic elimination of the corresponding electrical union between emitter and column. These fusible constrictions are used both for the electric test and for the inscription.

The process proposed by the present invention is used in the following manner:

1. The electric test is carried out between each of the contactsupplying terminals of the lines such as 4 and each half-column, such as $A_1$.
2. The fuses of each bad component are melted.
3. A reference column is selected from which the network of the matrix is repaired according to the present invention.
4. The unnecessary fuse of each good component is melted.
5. The half-columns are reunited with each other so that each pair of contiguous half-columns forms a single column.
6. In the course of the operation for the reunion of the half-columns with each other pair by pair, also the half-emitters are eventually reunited with respect to each other in pairs, as has been shown at P in FIG. 3.

The process proposed by the present invention is applied by degrees by gradually replacing a defective component by the next-following one on the same line. If a second defective component is discovered on the line, two possibilities may be resorted to, namely it is possible to either eliminate the column counted from the reference column, or a second reference column can be chosen from which the same process is reiterated.

The process proposed by the present invention has the following advantages:

The application thereof valorizes a significant number of matrices. In this connection it has been calculated that for a yield of 92 percent of the quality of the components, by a conventional control, it is necessary to reject a matrix of 525 bits, the electric test losing any significance by reason of the parasitic loopings of the current. The same matrix becomes usable — when an uncertain or chancy distribution of the defects is assumed — by virtue of the replacement or substitution system on the basis of several reference columns as proposed by the present invention. The electric test becomes applicable in the course of the manufacture of matrices for which the yield of the components passes from 95 to 90 percent, and even falls below this value.

Finally it can be pointed out that the process according to the present invention is applicable in a case where, in selecting a common region or zone that may be connected to the line, such as the base, two emitters are obtained which are mounted in parallel on the common base. The operations for carrying out and using the process described are simple, either one imparts to each individual emitter the dimension provided and foreseen for the final emitter — and in so doing one avoids having to reunite the connected emitter to that which no longer is connected — or else one imparts to each individual emitter a surface half of that provided and foreseen for the final emitter, which brings about the reunion of the two half-emitters as has bee indicated under point (6) of the foregoing compilation of the operations in the example given above.

It is obvious that the present invention may be applied also with an interchange of lines and columns and of base and emitter.

While I have shown and described one embodiment in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claim.

What is claimed is:

1. A process for manufacturing a read-only memory, comprising the steps of:
   a. providing, on a substrate, a plurality of semiconductive components, each with at least one semiconductive junction between a first and a second region of opposite conductivity type;
   b. disposing, on said substrate, a succession of conductive columns insulated from each other, said columns adjacent and insulated from each other being a lower rank column and an upper rank column, in order that each of the components will be located between a lower rank column and an upper rank column;

c. connecting said first region of each of said components to said lower rank column and to said upper rank column through a first and a second destructible connector, respectively;

d. disposing, on said substrate, a succession of conductive lines insulated from each other and from said columns;

e. connecting the second region of each of said components to one of said conductive lines in order that the several components connected to the same column by said first and second destructible connectors, respectively, will be connected to several respective lines, the number of these components being equal to the number of the several lines;

f. detecting which of said components are useful and which of said components are not useful and classifying said components according to useful and non-useful components;

g. destroying said first and second destructible connectors of each of said non-useful components;

h. destroying one of said first and second destructible connectors of each of said useful components in order that the number of said useful components remaining connected through the said destructible connectors to said some of said columns will be equal to the number of said lines, said some of said columns corresponding to useful columns; and i. destroying, for some of said useful components connected to said useful columns, that destructible connector which is not destroyed during step (h) in order to record information in said memory.

2. A process according to claim 1, wherein each of said first regions comprise first and second half regions insulated from each other and being of the same conductivity type, each forming a semiconductive junction with said second region, said columns comprise a first and a second half-column, each of which is conductive, and is adjacent and insulated from another respective half-column, each of said components being located between the half of a column corresponding to a lower rank column and the half of a column corresponding to an immediately adjacent upper rank column, and wherein step (c) comprises for each of said components, the first destructible connector connects the first half region to the second half-column of said lower rank column and the second destructible connector connects said second half region to the first half column of said upper rank column, step (f) comprises classifying each of said components subsequent to the detection of the electrical current flowing between the line connected to a respective component and at least one of the half columns connected to the component, and, furthermore, including an additional step (j) carried out subsequent to step (f), which comprises connecting two of the half columns to each other.

3. A process according to claim 1, wherein said destructible connectors are fuses.

4. A process according to claim 1, wherein each of said components comprises a transistor, having one common collector, said first regions correspond to emitter regions and said second regions correspond to base regions.

* * * * *